United States Patent [19]

Barton

[11] Patent Number: 5,738,038

[45] Date of Patent: Apr. 14, 1998

[54] WATER COOLER FOR PETS

[76] Inventor: Barbara A. Barton, 3571 E. Woodhaven St., Simi, Calif. 93063

[21] Appl. No.: 839,956

[22] Filed: Apr. 24, 1997

[51] Int. Cl.$^6$ .................................................. A01K 7/00
[52] U.S. Cl. ......................................................... 119/73
[58] Field of Search ............................. 119/51.5, 73, 77; 62/372, 400

[56] References Cited

U.S. PATENT DOCUMENTS

| | | | |
|---|---|---|---|
| 1,825,068 | 9/1931 | Jones et al. | 62/372 |
| 3,720,184 | 3/1973 | Pearce | 119/77 X |
| 4,573,434 | 3/1986 | Gardner | 119/77 |
| 5,044,173 | 9/1991 | Cheng | 62/372 |
| 5,456,090 | 10/1995 | McCoy | 62/372 |
| 5,488,927 | 2/1996 | Lorenzana et al. | 119/51.5 |

*Primary Examiner*—Robert P. Swiatek
*Assistant Examiner*—Elizabeth Shaw

[57] ABSTRACT

A water cooler for pets for providing a source of cool drinking water for pets. The inventive device includes a cooling member, such as a refreezable ice pack, and a bottle having a top and a bottom, wherein the bottle includes a neck portion extending downward from the bottom and a cavity open to the top, wherein the cavity is adapted for receiving the cooling member. A base member is provided and includes a port adapted for receiving the neck portion of the bottle, a water basin, and a channel interconnecting the port and the water basin. The cooling member cools water disposed within the bottle such that when a pet consumes water from the water basin, the water basin is replenished with cooled water from the bottle.

9 Claims, 3 Drawing Sheets 5,738,038

WATER COOLER FOR PETS

BACKGROUND OF THE INVENTION

1. Field of the Invention

The present invention relates to pet watering dishes and more particularly pertains to a new Water Cooler For Pets for providing a source of cool drinking water for pets.

2. Description of the Prior Art

The use of pet watering dishes is known in the prior art. More specifically, pet watering dishes heretofore devised and utilized are known to consist basically of familiar, expected and obvious structural configurations, notwithstanding the myriad of designs encompassed by the crowded prior art which have been developed for the fulfillment of countless objectives and requirements.

Known prior art pet watering dishes include U.S. Pat. Nos. 5,245,951; 4,869,385; D294,750; D355,056; D335,197; and D350,842.

While these devices fulfill their respective, particular objectives and requirements, the aforementioned patents do not disclose a new Water Cooler For Pets. The inventive device includes a cooling member, such as a refreezable ice pack, and a bottle having a top and a bottom, wherein the bottle includes a neck portion extending downward from the bottom and a cavity open to the top, wherein the cavity is adapted for receiving the cooling member. A base member is provided and includes a port adapted for receiving the neck portion of the bottle, a water basin, and a channel interconnecting the port and the water basin. The cooling member cools water disposed within the bottle such that when a pet consumes water from the water basin, the water basin is replenished with cooled water from the bottle.

In these respects, the Water Cooler For Pets according to the present invention substantially departs from the conventional concepts and designs of the prior art, and in so doing provides an apparatus primarily developed for the purpose of providing a source of cool drinking water for pets.

SUMMARY OF THE INVENTION

In view of the foregoing disadvantages inherent in the known types of pet watering dishes now present in the prior art, the present invention provides a new Water Cooler For Pets construction wherein the same can be utilized for providing a source of cool drinking water for pets.

The general purpose of the present invention, which will be described subsequently in greater detail, is to provide a new Water Cooler For Pets apparatus and method which has many of the advantages of the pet watering dishes mentioned heretofore and many novel features that result in a new Water Cooler For Pets which is not anticipated, rendered obvious, suggested, or even implied by any of the prior art pet watering dishes, either alone or in any combination thereof.

To attain this, the present invention generally comprises a cooling member, such as a refreezable ice pack, and a bottle having a top and a bottom, wherein the bottle includes a neck portion extending downward from the bottom and a cavity open to the top, wherein the cavity is adapted for receiving the cooling member. A base member is provided and includes a port adapted for receiving the neck portion of the bottle, a water basin, and a channel interconnecting the port and the water basin. The cooling member cools water disposed within the bottle such that when a pet consumes water from the water basin, the water basin is replenished with cooled water from the bottle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Water Cooler For Pets apparatus and method which has many of the advantages of the pet watering dishes mentioned heretofore and many novel features that result in a new Water Cooler For Pets which is not anticipated, rendered obvious, suggested, or even implied by any of the prior art pet watering dishes, either alone or in any combination thereof.

It is another object of the present invention to provide a new Water Cooler For Pets which may be easily and efficiently manufactured and marketed.

It is a further object of the present invention to provide a new Water Cooler For Pets which is of a durable and reliable construction.

An even further object of the present invention is to provide a new Water Cooler For Pets which is susceptible of a low cost of manufacture with regard to both materials and labor, and which accordingly is then susceptible of low prices of sale to the consuming public, thereby making such Water Cooler For Pets economically available to the buying public.

Still yet another object of the present invention is to provide a new Water Cooler For Pets which provides in the apparatuses and methods of the prior art some of the advantages thereof, while simultaneously overcoming some of the disadvantages normally associated therewith.

Still another object of the present invention is to provide a new Water Cooler For Pets for providing a source of cool drinking water for pets.

Yet another object of the present invention is to provide a new Water Cooler For Pets which includes a cooling member, such as a refreezable ice pack, and a bottle having a top and a bottom, wherein the bottle includes a neck portion extending downward from the bottom and a cavity open to the top, wherein the cavity is adapted for receiving the cooling member. A base member is provided and includes a port adapted for receiving the neck portion of the bottle, a water basin, and a channel interconnecting the port and the water basin. The cooling member cools water disposed within the bottle such that when a pet consumes water from the water basin, the water basin is replenished with cooled water from the bottle.

Still yet another object of the present invention is to provide a new Water Cooler For Pets that would maintain a pet's drinking water at a cool temperature for an extended period of time. Thus, eliminating the need for a pet owner to continually replace warm water with cool water or continually add ice cubes to warm water for cooling thereof.

Even still another object of the present invention is to provide a new Water Cooler For Pets that provides a pet with a source of cool drinking water which is more appealing to the pet and will help keep the pet's body temperature cooler. Thus, making the pet more comfortable.

Even still another object of the present invention is to provide a new Water Cooler For Pets that would fulfill the need for a watering dish that would provide a pet with a source of cool drinking water on warm days.

Even still another object of the present invention is to provide a new Water Cooler For Pets that would permit a pet owner to leave a pet unattended for a period of time with the comfort of knowing that a source of cool drinking water will be available for the pet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
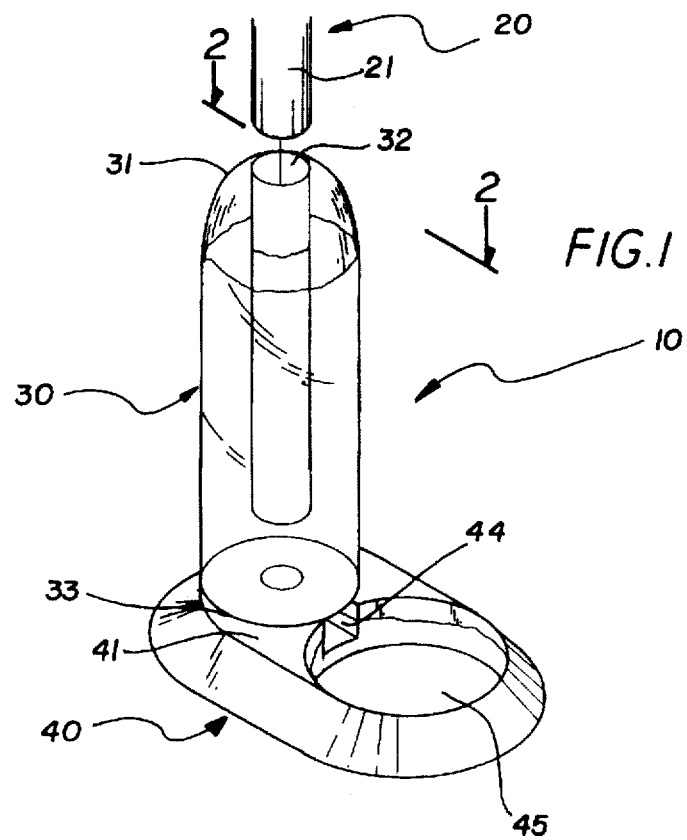
FIG. 1 is an illustration of a new Water Cooler For Pets according to the present invention.
Figure 2:
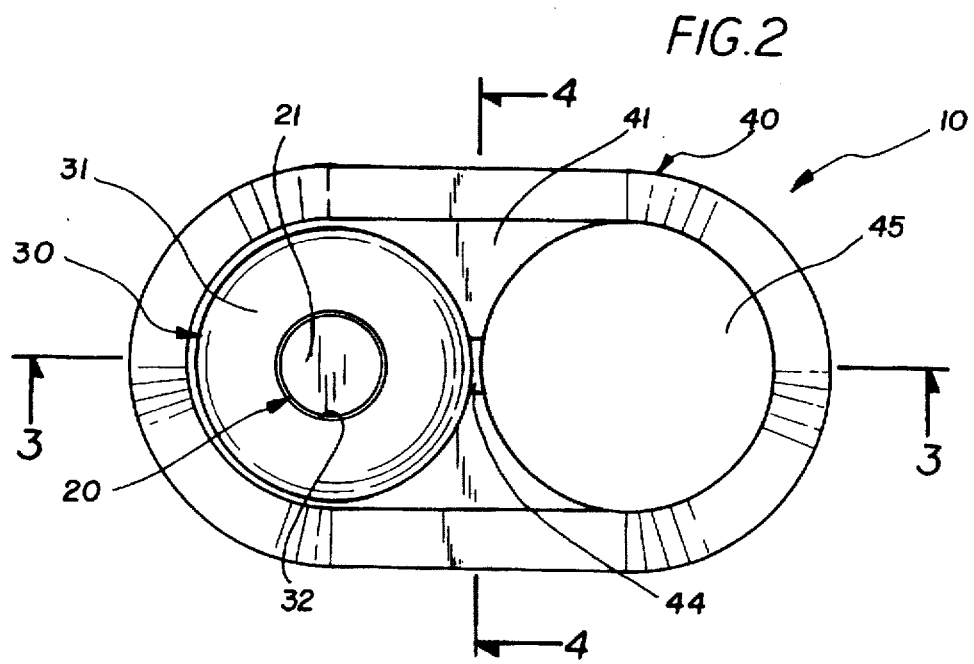
FIG. 2 is a top view thereof.
Figure 3:
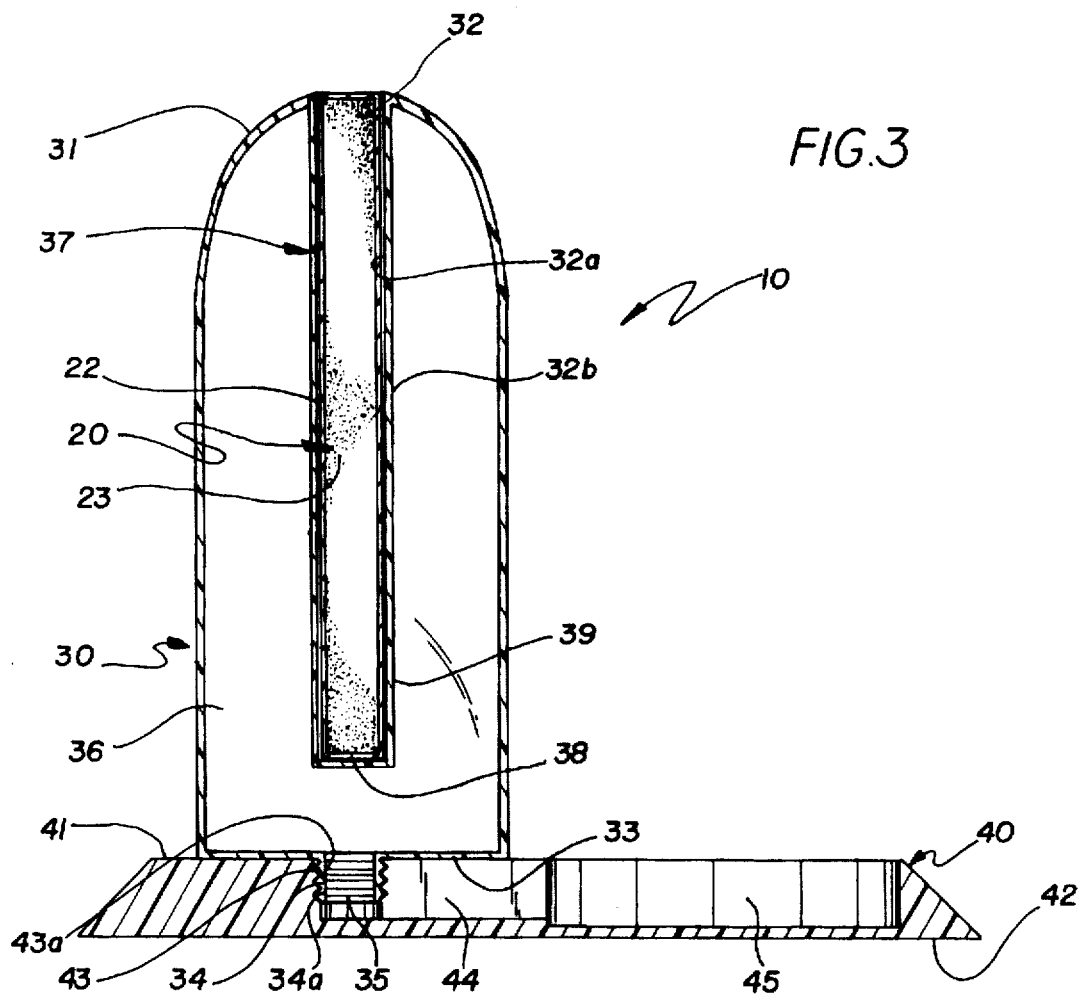
FIG. 3 is a cross sectional view taken along line 3—3 of FIG. 2.
Figure 4:
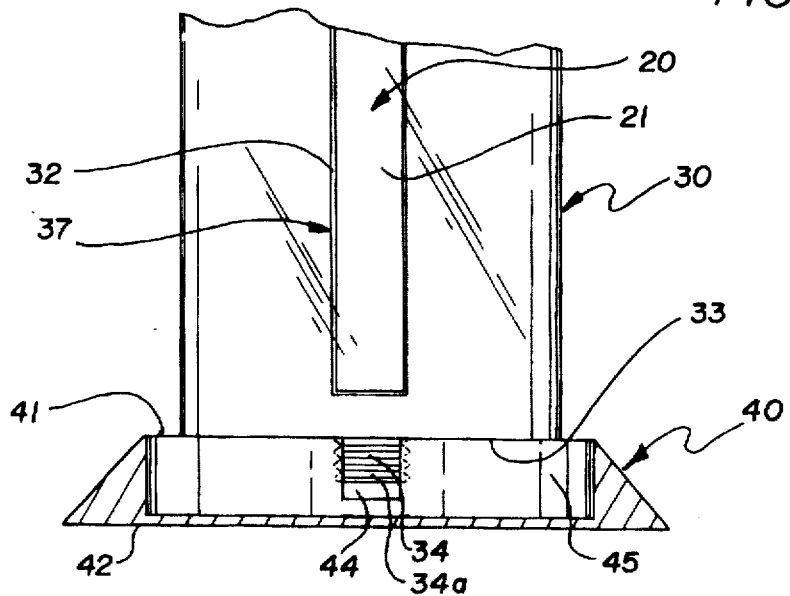
FIG. 4 is a cross sectional view taken along line 4—4 of FIG. 2.

With reference now to the drawings, and in particular to FIGS. 1 through 5 thereof, a new Water Cooler For Pets embodying the principles and concepts of the present invention and generally designated by the reference numeral 10 will be described.

More specifically, it will be noted that the Water Cooler For Pets 10 comprises a cooling member 20, such as a refreezable ice pack 21, and a bottle 30 having a top 31 and a bottom 33, wherein the bottle 30 includes a neck portion 34 extending downward from the bottom 33 and a cavity 32 open to the top 31, wherein the cavity 32 is adapted for receiving the cooling member 20. A base member 40 is provided and includes a port 43 adapted for receiving the neck portion 34 of the bottle 30, a water basin 45, and a channel 44 interconnecting the port 43 and the water basin 45. The cooling member 20 cools water disposed within the bottle 30 such that when a pet consumes water from the water basin 45, the water basin 45 is replenished with cooled water from the bottle 30.

As best illustrated in FIGS. 1 through 4, it can be shown that the cooling member 20 is a refreezable ice pack 21 comprising an enclosed shell 22 and a refreezable substance 23 disposed within the enclosed shell 22. The refreezable substance 23 is characterized by possessing the ability to be froze and thawed repeatedly. Typically, the refreezable substance 23 is a gel-like compound characterized by the ability to remain cold for an extended period of time in ambient conditions. However, the refreezable substance 23 may be water.

The bottle 30 has a top 31, a bottom 33, and a hollow interior 36. The neck portion 34 of the bottle 30 extends downward from the bottom 33 thereof and has an open end 35. As such, the bottle 30 is inverted and the hollow interior 36 of the bottle 30 is fillable with water through the open end 35. The bottle 30 is preferably formed of a transparent material that allows for visual assessment of the quantity of water disposed therein.

The cavity 32 is open to the top 31 of the bottle 30 and is shaped for receiving and holding the cooling member 20 such that the cooling member 20 may be easily inserted and removed. The cavity 32 has an inner surface 32a and an outer surface 32b, wherein the outer surface 32b contacts water contained within the hollow interior 36 of the bottle 30. The cavity 32 extends from the top 31 of the bottle 30 to substantially the bottom 33 of the bottle 30. As a result, the cooling member 20, albeit indirectly, is substantially immersable into the water disposed within the bottle 30. As such, the cooling member 20 cools water disposed within the hollow interior 36 of the bottle 30 by conduction.

In a preferred embodiment, the cooling member 20 is elongated and cylindrical shaped. Accordingly, the cavity 32 is elongated and cylindrical shaped for adequately receiving and holding the cooling member 20. In the preferred embodiment, the cavity 32 is defined by a tubular member 37 comprising a circular planar bottom wall 38 and a tubular wall 39 extending upward from the circular planar bottom wall 38 to the top 31 of the bottle 30.

Figure 5:
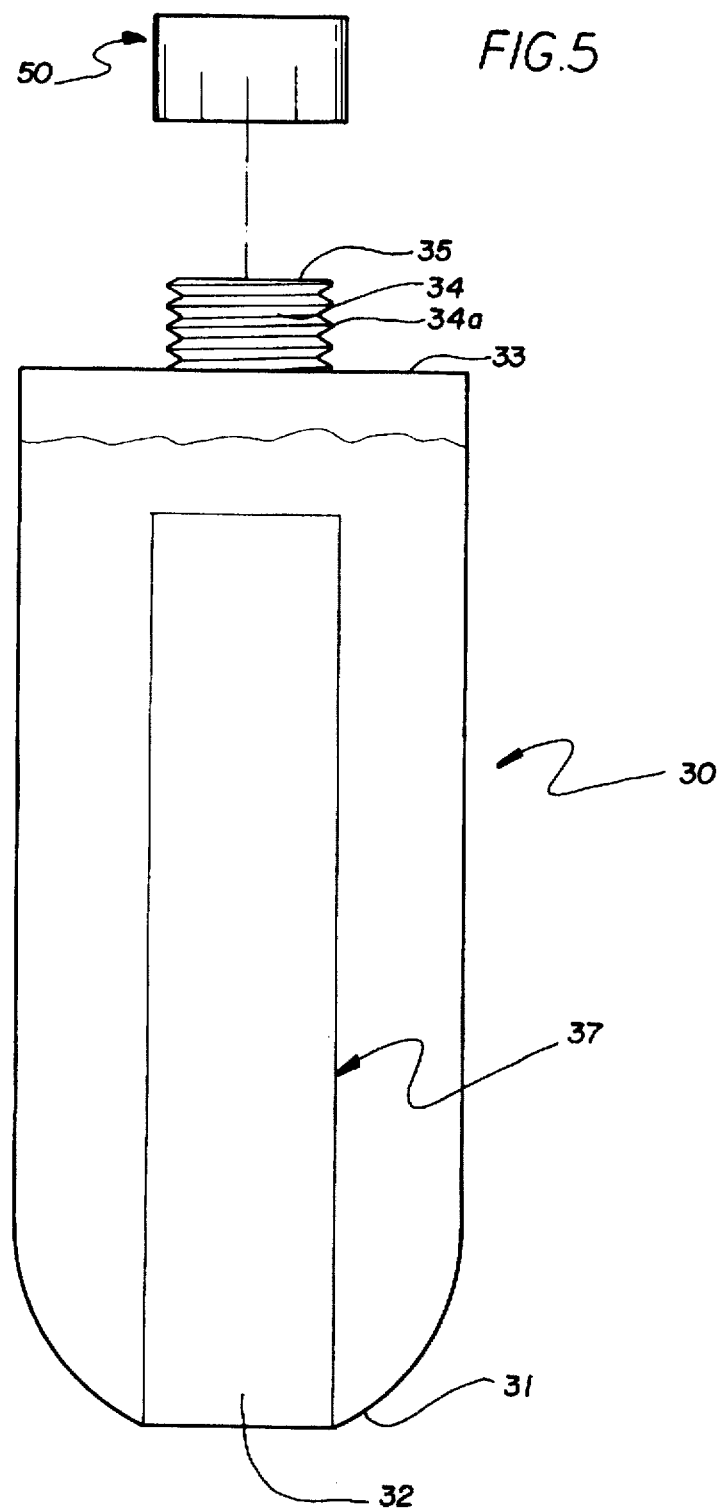
FIG. 5 is an illustration of the bottle when inverted and a cap for closing the open end of the bottle according to the present invention.

The top 31 of the bottle 30 is generally flat such that the bottle 30 may be removed from the base member 40, inverted, and placed on a flat surface. A cap 50 is provided for closing the open end 35 of the neck portion 34 when the bottle 30 is removed from the base member 40 (FIG. 5).

The base member 40 has a top surface 41 and a bottom surface 42. The port 43, adapted for receiving the neck portion 34 of the bottle 30, is provided in the top surface 41 of the base member 40 at one end thereof. The neck portion 34 of the bottle 30 mates with the port 43 of the base member 40 such that the bottom 33 of the bottle 30 rests on the top surface 41 of the base member 40 and a water tight seal is formed between the neck portion 34 and the port 43. In a preferred embodiment, the bottle 30 and the base member 40 are threadingly coupled, wherein external threads 34a provided on the neck portion 34 of the bottle 30 engage internal threads 43a included in the port 43 of the base member 40.

The water basin 45 is open to the top surface 41 of the base member 40 and is provided opposite the port 43. The water basin 45 is generally circular in shape. The channel 44 interconnects the port 43 and the water basin 45 and allows water to flow therebetween. The channel 44 generally has a depth less than that of the water basin. The arrangement of the bottle 30, the port 43, the channel 44, and the water basin 45 cooperate to maintain a generally consistent level of water in the water basin 45.

In use, the bottle 30 is inverted and the hollow interior 36 of the bottle 30 is filled with water through the open end 35 therein. The base member 40 is also inverted and the inverted bottle and the inverted base member are joined together by threading the neck portion 34 of bottle 30 into the port 43 of the base member 40 until the bottom 33 of the bottle 30 contacts the top surface 41 of the base member 40. Thereafter, the coupled bottle and base member are returned upright and water disposed within the bottle 30 flows out the open end 35 of the bottle 30, into the port 43 of the base member 40, through the channel 44, and into the water basin 45. Since the open end 35 of the bottle 30 is submerged into the water, only a quantity of water necessary for filling the port 43, the channel 44, and the water basin 45 is released. Finally, the cooling member 20, preferably in a frozen state, is inserted into the cavity 32 provided in the top 31 of the bottle 30. The cooling member 20 cools the water disposed within the bottle 30 such that when a pet consumes water from the water basin 45, the water basin 45 is replenished with cooled water from the bottle 30.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A cool water dispensing system for an animal, comprising:
    a cooling member;
    a bottle having a top and a bottom, said bottle including a neck portion extending downward from said bottom thereof, said neck portion having an open end,
    said bottle having a cavity open to said top thereof, said cavity adapted for removably receiving and holding said cooling member; and
    a base member releasably coupled to said bottle, said base member including a port adapted for receiving said neck portion of said bottle, a water basin, and a channel interconnecting said port and said water basin,
    said cooling member cooling water disposed within said bottle whereby when said animal consumes water from said water basin, said water basin is replenished with cooled water from said bottle.

2. The cool water dispensing system of claim 1, wherein said cooling member comprises:
    an enclosed shell, and
    a refreezable substance disposed within said enclosed shell.

3. The cool water dispensing system of claim 1, wherein said cavity extends from said top of said bottle to substantially said bottom of said bottle.

4. The cool water dispensing system of claim 3, wherein said cooling member is elongated and cylindrical shaped, and wherein
    said cavity is elongated and cylindrical shaped.

5. The cool water dispensing system of claim 4, wherein said cavity is defined by a tubular member comprising a circular planar bottom wall and a tubular wall extending upward from said circular planar bottom wall to said top of said bottle.

6. The cool water dispensing system of claim 1, wherein said top of said bottle is generally flat such that said bottle may be removed from said base member, inverted, and placed on a flat surface.

7. The cool water dispensing system of claim 1, further comprising:
    a cap mateable with said neck portion of said bottle, said cap closing said open end of said neck portion when said bottle is removed from said base member.

8. The cool water dispensing system of claim 1, wherein said base member has a top surface, wherein
    said port is provided in said top surface of said base member, and wherein
    said neck portion of said bottle mates with said port of said base member such that said bottom of said bottle abuts said top surface of said base member.

9. The cool water dispensing system of claim 1, wherein said bottle and said base member are threadingly coupled.

* * * * *